United States Patent Office 2,797,702
Patented July 2, 1957

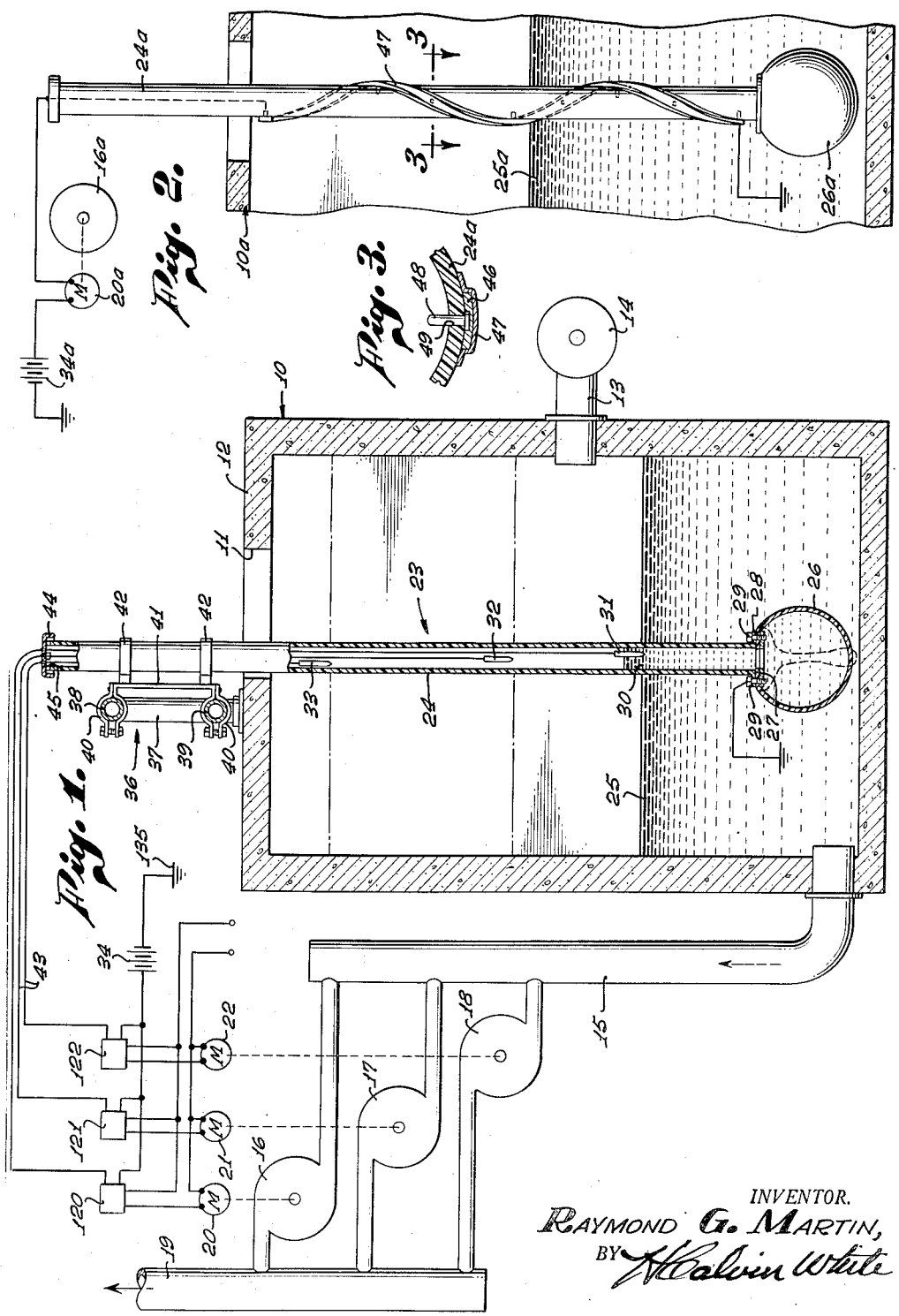

2,797,702
LIQUID LEVEL CONTROL
Raymond G. Martin, El Monte, Calif.
Application February 7, 1955, Serial No. 486,531
21 Claims. (Cl. 137—392)

This invention relates to improved apparatus for responding to changes in the level of a liquid in a tank, typically for the purpose of controlling the flow of liquid either into or out of the tank, to thereby automatically regulate the liquid level.

Liquid level controls embodying the invention are preferably of the type including electrical contact means or electrodes which are positioned to be engaged by the liquid when it reaches a predetermined level or levels, and to close an electrical control circuit as a result of that contact. Such electrode type controls have in the past had several distinct disadvantages, largely by reason of the direct exposure of the electrodes to the liquid being controlled. Specifically, where the liquid is highly corrosive, as where sewage or a corrosive chemical is being handled, the liquid attacks and soon fouls the electrodes, and results in poor or improper electrical response after a relatively short period of use. Also, where the liquid is of a foaming type, the contact of the foam with an electrode may close the control circuit before the liquid itself has actually reached a proper level. Further, if the liquid is poorly conductive, the response of the system is of course adversely affected by such poor conductivity; or if the liquid is combustible, the making and breaking of the electrical control circuits may have a tendency to ignite or explode the liquid or its vapors.

A major object of the invention is to provide a liquid level responsive apparatus which is so designed as to avoid the above disadvantages flowing from the exposure of the electrodes, or other level responsive means such as floats, directly to the liquid. For this purpose the electrodes or their equivalent are isolated from the liquid being controlled, and are contacted only by a second liquid, which may be non-corrosive, non-foaming, non-combustible, and reliably conductive. The level of this second liquid is caused to vary in correspondance with the level of the primary liquid.

Structurally, a device embodying the invention includes a vertically extending chamber, preferably a tube, which contains the secondary liquid, with a diaphragm or movable wall being provided at the lower end of the chamber and between the two liquids. This diaphragm equalizes the pressure between the two liquids to cause the liquid level in the tube to follow the main liquid level. The contacts or other level responsive means may then be positioned in the tube to contact only the inner or second liquid. The diaphragm may be a flexible bladder or hollow bulb connected to the lower end of the tube, and exposed at its outer side to the primary liquid and at its inner side to the second liquid. One of the electrical contacts, serving as a ground connection, may be an electrically conductive element typically a screw or screws, which also serves a second function of attaching the bulb to the tube. Both the tube and bulb may be formed of electrically non-conductive material, such as suitable resinous plastic material.

The above and other features and objects of the present invention will be better understood from the following detailed description of the typical embodiments illustrated in the accompanying drawing, in which:

Fig. 1 is a partially diagrammatic vertical section through a liquid level responsive apparatus constructed in accordance with the invention;

Fig. 2 is a fragmentary view corresponding to Fig. 1, but showing a variational form of the invention; and Fig. 3 is an enlarged fragmentary horizontal section taken on line 3—3 of Fig. 2.

Referring first to Fig. 1, I have there shown at 10 a liquid containing tank or chamber, within which the liquid level is to be controlled by apparatus embodying the present invention. Tank 10 may typically be a conventional cement walled sewage settling tank or basin, having an access opening 11 in its upper wall 12. Sewage is pumped into tank 10 through an inlet line 13 by a continuously operating pump 14. The sewage is withdrawn from tank 10 through a discharge line 15, by means of three parallel connected motor driven pumps 16, 17 and 18, all of which discharge into a common line 19. Pumps 16, 17 and 18 are driven by individual electric motors 20, 21, and 22 respectively, which are controlled by a liquid level responsive control unit 23 positioned within the tank.

The control unit 23 includes a vertically elongated and vertically extending rigid tube 24, preferably formed of a suitable rigid resinous plastic material. Tube 24 extends vertically from a location above tank 10, downwardly through opening 11 and into the sewage or liquid 25, to a point near the bottom of the tank. At its lower end, tube 24 carries a flexible liquid impervious diaphragm 26, which preferably takes the form of an essentially spherical bladder or ball. This bladder 26 may be formed of a fully flexible resinous plastic material such as a vinyl plastic, or may be formed of a fully flexible rubber, either a natural rubber or a synthetic rubber such as neoprene. Preferably, both tube 24 and bladder 26 are electrically non-conductive.

Bladder 26 has a circular opening in its upper wall through which it communicates with the lower end of tube 24. The bladder is annularly attached to the lower end of the tube in fluid-tight sealed relation, as by clamping the bladder material about its upper opening between an annular lower flange 28 on tube 24, and a clamping ring 27. Ring 27 may be tightened upwardly against the annular edge of the bladder material by means of a number of circularly spaced bolts 29, which may be of an electrically conductive material such as stainless steel, to form an electrical ground connection between the interior and exterior of the tube and bladder assembly.

A liquid which is relatively non-corrosive as compared with the sewage is filled into the interior of bladder 26 and tube 24, and is effectively sealed against any communication with the sewage by means of the tube and bladder. In most instances, the liquid 30 within the tube and bladder may be fresh water. As will be understood, when the sewage level rises in tank 10, the increase in hydrostatic head increases the pressure at the outer side of bladder 26, which increased pressure causes the bladder to collapse or flex inwardly to a certain extent and thereby raise the liquid level within tube 24. The bladder collapses sufficiently to produce a raised liquid level or hydrostatic head within tube 24 which will exactly counteract the increased head at the outside of the bladder. Thus, the water level within tube 24 automatically follows the liquid level at the outside of the tube, even though a fluid-tight seal is maintained between the interior and exterior of the tube. The density of the water within tube 24 is sufficiently close to the density of the sewage at the outside of the tube (the sewage of course also being primarily water) to cause the inside and outside levels to normally be approximately even.

Within tube 24, I provide a number of electrodes or electrical contacts 31, 32 and 33, which are adapted by contact with liquid within tube 24 (which liquid is electrically conductive) to control the starting and stopping of discharge pump motors 20, 21 and 22. Contacts 31, 32 and 33 are preferably located at three vertically spaced locations within tube 24, and act to close electrical circuits to the three pump motors respectively when the water within tube 24 rises to those three locations respectively.

The three motors 20, 21 and 22 are energized by a common electrical power source 34, under the control of individual relay and starter units 120, 121 and 122 respectively (of conventional construction). These relay and starter units are in turn controlled by the three electrodes 31, 32 and 33. The primary or control circuits of the units 120, 121 and 122 are or may be energized by a low voltage power source 34, one side of which is electrically connected to the electrically conductive water or other liquid within tube 24 and bladder 26. This electrical connection with the liquid in tube 24 may be made by means of the electrically conductive bolts 29 extending from the outside to the inside of the tube and bladder, with the power source 34 either being directly connected by a suitable wire to bolts 29, or by grounding one side of the power source at 135, so that the sewage itself serves to form an electrical ground connection to the bolts.

The other side of the power source 34 is connected to relay and starter units 120, 121 and 122 in parallel, with these units in turn being connected to the three vertically spaced electrodes 31, 32 and 33 within tube 24.

The tube and bladder assembly may be mounted in any suitable way to tank 10, as by means of a suitable upstanding support structure 36 at the upper side of the tank. This support structure may include an upstanding member 37, having a pair of transverse tubular elements 38 and 39, to which clamps or straps 40 are attached. These straps may carry a vertically extending member 41 from which there project a pair of vertically spaced rings 42 disposed about tube 24. Preferably, rings 42 are sufficiently loose to allow for vertical adjustment of the tube 24 relative to the support structure, while at the same time being sufficiently tight to frictionally retain the tube at any adjusted position. The lead lines 43 from electrodes 31, 32 and 33 to the pump motors preferably extend upwardly within tube 24 and through a cap 44 which extends across the upper end of the tube. Openings or notches 45 may be formed at the upper end of tube 24 for forming breather openings placing the interior of tube 24 in communication with the atmosphere, to allow the liquid level within the tube to freely follow the liquid level at the outside of the tube.

When the apparatus of Fig. 1 is in operation, inlet pump 14 (or in some cases a gravity line) continuously feeds sewage into tank 10. As the sewage level rises, the increased hydrostatic head causes bladder 26 to partially collapse and produce a corresponding rise in the level of the sealed liquid within tube 24. If the liquid level within the interior of the tube reaches a point at which the liquid contacts the lowermost electrode 31, such contact closes the circuit through liquid 30 to relay unit 120, which then energizes motor 20 to start pump 16 and cause it to commence withdrawing sewage from tank 10. Similarly, a rise in liquid level to a point of contact with electrode 32 closes the circuit relay 121 and thus to the motor 21 to cause pump 17 to commence operation in parallel with pump 16. Also, a further rise in liquid level to electrode 33 starts the third pump 18, so that all three pumps are then acting simultaneously to draw liquid from tank 10. When the liquid level falls beneath any of the three electrodes, the circuit to the corresponding pump motor is broken, and that pump then stops. Thus, the control system serves automatically to start and stop the pumps 16, 17 and 18 in a manner maintaining the liquid level in tank 10 within essentially a predetermined range.

A particular advantage of the illustrated invention resides in the fact that the electrodes 31, 32 and 33 are completely protected against any contact with the highly corrosive sewage or other liquid 25 whose level is being controlled. These electrodes are contacted only by the fresh water or other selected liquid within the tube and bladder, and the material of the electrodes is so chosen as to be unaffected by that liquid. As a result, the system will function effectively and reliably for very long periods of time.

Figs. 2 and 3 illustrate a variational form of the invention, in which the tank 10a, tube 24a, bladder 26a, the tube supporting structure, and the inlet pump are substantially the same as in Fig. 1. This second form of the invention differs from the first in that only one motor driven sewage discharging pump 16a is employed instead of the three pumps 16, 17 and 18 of Fig. 1, and further in that the manner of electrically controlling operation of this pump is different than in Fig. 1. Specifically, in Figs. 2 and 3, there is provided an elongated strip of electrically resistive material 46, which acts as a rheostat or variable resistor element in the circuit of pump motor 20a to vary the voltage applied to the motor and thereby control the motor speed.

Resistor strip 46 may be wound helically about the outside of rigid plastic tube 24a, and is suitably protected against contact with the sewage 25a, as by a protective housing 47 typically formed of the same plastic material as tube 24a. A series of electrodes or electrically conductive pins 48 extend from points of contact with resistor strip 46, inwardly through apertures 49 in the wall of tube 24a and into contact with the sealed liquid within tube 24a. These electrodes 48 are provided at a number of locations spaced vertically along tube 24a and the resistor strip 46. The resistor strip 46 is connected in series with pump motor 20a and power source 34a, as by connecting the upper end of the resistor strip to one side of the motor, and connecting one side of power source 34a through a ground connection to the lower end of the resistor strip.

In operation, the bladder 26a of the second form of the invention functions the same as the bladder 26 of Fig. 1, to cause the liquid level within tube 24a to move vertically in correspondence with the sewage level at the outside of the tube. As the liquid level within tube 24a rises, the liquid successively contacts the various electrodes 48, and upon engagement with each of these electrodes the liquid within the tube forms a short circuit past a portion of the resistor element 46. Thus, as the liquid level progressively rises, the effective resistance of element 46 progressively decreases, and as a result the speed of motor 20a and pump 16a increases. The increased speed of pump 16a causes the pump to withdraw sewage from tank 10a at an increased rate, to thus tend to prevent further rises in the liquid level. This system thus automatically regulates the speed of the pump and motor in accordance with the changes in liquid level, so that a proper liquid level is maintained at all times. At the same time, all electrical contacts in the Figs. 2 and 3 form of the invention are protected against contact with the sewage, in the same manner that the electrodes of Fig. 1 are protected.

I claim:

1. Apparatus comprising a liquid-containing tank, means forming a vertically extending chamber containing a body of liquid isolated from the liquid in said tank, a series of pumps operable to pump the tank liquid and to thereby control the level of said liquid in the tank, a flexible diaphragm interposed between the liquid in said tank and the liquid in said chamber and causing a rise in liquid level in the chamber in response to the increase in pressure resulting from a rise in the liquid level in the tank, and means responsive to changes in liquid level in the chamber and operable to selectively actuate said pumps in accordance with said level changes.

2. Apparatus as recited in claim 1, in which said means forming said chamber comprise a tube extending downwardly within said liquid in the tank and having a lower portion communicating with said diaphragm.

3. Apparatus as recited in claim 1, in which said last mentioned means comprise a plurality of electrical contacts exposed to the liquid in said chamber at different levels and controlling said pumps respectively in accordance with arrival of the chamber liquid at said levels.

4. Apparatus for responding to changes in the level of a liquid in a tank, comprising means forming a vertically extending chamber containing a body of liquid isolated from the liquid in said tank, a flexible diaphragm interposed between the liquid in said tank and the liquid in said chamber and causing a rise in liquid level in the chamber in response to the increase in pressure resulting from a rise in the liquid level in the tank, and means for selectively actuating a series of pumps operable to control the liquid level in said tank, said last mentioned means being responsive to changes in liquid level in the chamber.

5. Apparatus comprising a liquid-containing tank, means forming a vertically extending chamber containing a body of liquid isolated from the liquid in said tank, a series of pumps operable to pump the tank liquid and to thereby control the level of said liquid in the tank, pressure responsive movable wall means interposed between and forming a liquid-tight seal between the liquid in said tank and the liquid in said chamber and causing a rise in liquid level in the chamber in response to the increase in pressure resulting from a rise in the liquid level in the tank, and means responsive to changes in liquid level in the chamber and operable to selectively actuate said pumps in accordance with said level changes.

6. Apparatus comprising a tank containing a first liquid which is primarily water, pump means operable to pump said first liquid and thereby control the level of said liquid in the tank, means forming a vertically extending chamber containing a body of a second liquid isolated from the first liquid in said tank, a flexible diaphragm interposed between the first liquid in said tank and the second liquid in said chamber and causing a rise in liquid level in the chamber in response to the increase in pressure resulting from a rise in the liquid level in the tank, and means responsive to changes in the liquid level in said chamber and operable to actuate said pump means in accordance with said level changes, the liquid in said chamber being primarily water and thereby having a density close enough to that of the first liquid to always maintain the liquid level in the chamber approximately equal to the liquid level in said tank.

7. Apparatus comprising a tank containing a first liquid which is primarily water, pump means operable to pump said first liquid and thereby control the level of said liquid in the tank, means forming a vertically extending chamber containing a body of a second liquid isolated from the first liquid in said tank, a flexible diaphragm interposed between the first liquid in said tank and the second liquid in said chamber and causing a rise in liquid level in the chamber in response to the increase in pressure resulting from a rise in the liquid level in the tank, and means responsive to changes in the liquid level in said chamber and operable to actuate said pump means in accordance with said level changes, the liquid in said chamber being primarily water and thereby having a density close enough to that of the first liquid to always maintain the liquid level in the chamber approximately equal to the liquid level in said tank, said chamber being open to communication with the surrounding atmosphere at a location above the liquid therein to allow said liquid level in the chamber to freely follow the level of said first liquid.

8. Apparatus comprising a tank containing a first liquid which is primarily water, pump means operable to pump said first liquid and thereby control the level of said liquid in the tank, means forming a chamber extending vertically within said first liquid in the tank and containing a body of a second liquid isolated from the first liquid in said tank, a flexible diaphragm interposed between the first liquid in said tank and the second liquid in said chamber and causing a rise in liquid level in the chamber in response to the increase in pressure resulting from a rise in the liquid level in the tank, and means responsive to changes in the liquid level in said chamber and operable to actuate said pump means in accordance with said level changes, the liquid in said chamber being primarily water and thereby having a density close enough to that of the first liquid to always maintain the liquid level in the chamber approximately equal to the liquid level in said tank, said chamber being open to communication with the surrounding atmosphere at a location above the liquid therein to allow said liquid level in the chamber to freely follow the level of said first liquid.

9. Apparatus as recited in claim 8, in which said pump means comprise a plurality of motor driven pumps for pumping said first liquid and controlling its level, and said liquid level responsive means comprise a plurality of electrical contacts positioned to contact the liquid in said chamber at different levels and controlling the energization of said pumps respectively.

10. Apparatus as recited in claim 8, in which said pump means comprise a motor driven pump for pumping said first liquid and controlling the level thereof, said level responsive means comprising electrical control means contacting the liquid in said chamber and operable to vary the speed of said motor driven pump between a series of different speeds in response to arrival of the liquid in the chamber at a series of different levels respectively.

11. Apparatus comprising a tank containing a first body of liquid, means forming a chamber extending vertically within said first liquid and containing a second body of liquid isolated from the first, pump means operable to pump said first liquid and to thereby control its level in the tank, a flexible diaphragm interposed between said first liquid in the tank and said second liquid in the chamber and causing a rise in liquid level in the chamber in response to the increase in pressure resulting from a rise in the level of said first liquid in the tank, and means responsive to changes in the level of said second liquid and operable to actuate said pump means in accordance with said level changes.

12. Apparatus as recited in claim 11, in which said means forming the chamber comprise a rigid tube of electrically non-conductive material extending downwardly within the tank liquid, said diaphragm comprising a hollow flexible ball connected to the lower end of said tube, and level responsive means comprising electrical contact means exposed to, and responsive to changes in the level of, the liquid in said tube.

13. A liquid level controlling unit for use with a tank containing a first liquid which is primarily water, said unit comprising pump means operable to pump said first liquid and thereby control the level of said liquid, means forming a vertically extending chamber containing a body of a second liquid isolated from said first liquid in the tank, a flexible diaphragm interposed between the first liquid in said tank and the second liquid in said chamber and causing a rise in liquid level in the chamber in response to the increase in pressure resulting from a rise in the liquid level in the tank, and means responsive to changes in the liquid level in said chamber and operable to actuate said pump means in accordance with said level changes, the liquid in said chamber being primarily water and thereby having a density close enough to that of the first liquid to always maintain the liquid level in the chamber approximately equal to the liquid level in said tank.

14. A liquid level controlling unit for use with a tank containing a first liquid which is primarily water, said unit comprising pump means operable to pump said first liquid and thereby control the level of said liquid, means forming a vertically extending chamber containing a body of a second liquid isolated from said first liquid in the tank, a flexible diaphragm interposed between the first liquid in said tank and the second liquid in said chamber and causing a rise in liquid level in the chamber in response to the increase in pressure resulting from a rise in the liquid level in the tank, and means responsive to changes in the liquid level in said chamber and operable to actuate said pump means in accordance with said level changes, the liquid in said chamber being primarily water and thereby having a density close enough to that of the first liquid to always maintain the liquid level in the chamber approximately equal to the liquid level in said tank, said chamber being open to communication with the surrounding atmosphere at a location above the liquid therein to allow said liquid level in the chamber to freely follow the level of said first liquid.

15. Apparatus as recited in claim 14, in which said chamber forming means comprises a tube for extending downwardly within said liquid in the tank, said diaphragm comprising a flexible hollow ball connected to the lower end of said tube and exposed at the outside to the tank liquid and at the inside to the liquid in the tube.

16. Apparatus as recited in claim 14, in which said level responsive means comprise electrical contact means exposed to, and responsive to changes in the level of, the liquid in said tube.

17. Apparatus as recited in claim 14, in which said means forming the chamber comprise a rigid tube of electrically non-conductive material, said diaphragm comprising a hollow flexible ball connected to the lower end of said tube, said level responsive means comprising electrical contacts exposed to, and responsive to changes in the level of, the liquid in said tube, and said contacts including electrically conductive means attaching said ball to said tube and forming an electrical connection between the exterior and interior of the tube and ball.

18. Apparatus as recited in claim 17, in which attaching means comprise electrically conductive bolts attaching the ball to the tube and contacting the liquid at both the inside and outside of the tube and ball, said tube and ball being formed of resinous plastic material.

19. Apparatus comprising a liquid containing tank, means forming a vertically extending chamber containing a body of liquid isolated from the liquid in said tank, a variable speed motor driven pump for pumping the tank liquid and controlling the level thereof, a flexible diaphragm interposed between the liquid in said tank and the liquid in said chamber and causing a rise in liquid level in the chamber in response to the increase in pressure resulting from a rise in the liquid level in the tank, and electrical control means contacting the liquid in said chamber and operable to vary the speed of said motor driven pump between a series of different speeds in response to arrival of the liquid in the chamber at a series of different levels respectively.

20. A liquid level controlling unit for use with a tank containing a liquid, said unit comprising means forming a vertically extending chamber containing a body of liquid isolated from the liquid in said tank, a variable speed motor driven pump for pumping the tank liquid and controlling the level thereof, a flexible diaphragm interposed between the liquid in said tank and the liquid in said chamber and causing a rise in liquid level in the chamber in response to the increase in pressure resulting from a rise in the liquid level in the tank, and electrical control means contacting the liquid in said chamber and operable to vary the speed of said motor driven pump between a series of different speeds in response to arrival of the liquid in the chamber at a series of different levels respectively.

21. A liquid level controlling unit as recited in claim 20, in which said electrical control means comprise a control circuit for the pump motor including electrical resistor means in electrical contact, at different locations along the resistor means, with the liquid in said chamber at a series of different levels respectively.

References Cited in the file of this patent

UNITED STATES PATENTS

| | | |
|---|---|---|
| 2,029,765 | Durdin | Feb. 4, 1936 |
| 2,213,485 | Conley | Sept. 3, 1940 |
| 2,398,375 | Heenan | Apr. 16, 1946 |